United States Patent
Balducci et al.

(10) Patent No.: US 9,824,051 B2
(45) Date of Patent: Nov. 21, 2017

(54) ACCESS APPLIANCE PROVIDING DIRECT DISPLAY DATA CHANNEL (DDC) INTERFACE CONNECTION AND STORED MONITOR CALIBRATION INFORMATION

(71) Applicant: AVOCENT HUNTSVILLE CORP., Huntsville, AL (US)

(72) Inventors: Michael J. Balducci, Arab, AL (US); Michael F. Lucero, Toney, AL (US); Mark A. Nicolas, Madison, AL (US)

(73) Assignee: AVOCENT HUNTSVILLE, LLC, Huntsville, AL (US)

( * ) Notice: Subject to any disclaimer, the term of this patent is extended or adjusted under 35 U.S.C. 154(b) by 242 days.

(21) Appl. No.: 14/390,603

(22) PCT Filed: Apr. 3, 2013

(86) PCT No.: PCT/US2013/035087
§ 371 (c)(1),
(2) Date: Oct. 3, 2014

(87) PCT Pub. No.: WO2013/152082
PCT Pub. Date: Oct. 10, 2013

(65) Prior Publication Data
US 2015/0081935 A1 Mar. 19, 2015

Related U.S. Application Data

(60) Provisional application No. 61/620,142, filed on Apr. 4, 2012.

(51) Int. Cl.
*G06F 13/12* (2006.01)
*G06F 13/40* (2006.01)
(Continued)

(52) U.S. Cl.
CPC .......... *G06F 13/4068* (2013.01); *G06F 13/10* (2013.01); *G06F 13/14* (2013.01); *G06F 15/16* (2013.01)

(58) Field of Classification Search
None
See application file for complete search history.

(56) References Cited

U.S. PATENT DOCUMENTS

2004/0027515 A1* 2/2004 Itakura ............... G09G 5/006
349/110
2005/0223269 A1* 10/2005 Stolowitz ............ G06F 3/0617
714/6.12
(Continued)

FOREIGN PATENT DOCUMENTS

CN 101226467 A 7/2008
CN 101620521 A 1/2010
(Continued)

OTHER PUBLICATIONS www.wikipedia.com, Multiplexer, Apr. 2011, pp. 1-6.*
(Continued)

*Primary Examiner* — Henry Tsai
*Assistant Examiner* — Dean Phan
(74) *Attorney, Agent, or Firm* — Harness, Dickey & Pierce, P.L.C.

(57) ABSTRACT

A remote access appliance is disclosed which provides electronic display identification data (EDID) information associated with a monitor which is communicating with the appliance, to any one of a plurality of remote computers in communication with the appliance, without requiring rebooting of a selected one of the remote computers. A plurality of multiplexers is controlled by a controller for interfacing a selected one of the computers to a display data channel (DDC) interface associated with the monitor. Memory devices are accessible by each of the computers (Continued)

and by the controller which store the EDID information. The controller controls the multiplexers so that any selected one of the computers can communicate with the monitor, and can access an associated one of the memory devices to obtain the stored EDID information, or such that the EDID information can be loaded into each of the memory devices.

16 Claims, 6 Drawing Sheets

(51) Int. Cl.
*G06F 13/14* (2006.01)
*G06F 15/16* (2006.01)
*G06F 13/10* (2006.01)

(56) References Cited

U.S. PATENT DOCUMENTS

| | | | | |
|---|---|---|---|---|
| 2008/0184320 | A1* | 7/2008 | Lou | G06F 3/1454 725/98 |
| 2008/0198128 | A1* | 8/2008 | Tsai | G06F 3/14 345/156 |
| 2009/0276812 | A1 | 11/2009 | Greene et al. | |
| 2011/0271296 | A1 | 11/2011 | Tu et al. | |
| 2011/0298812 | A1 | 12/2011 | Liu et al. | |
| 2013/0050084 | A1* | 2/2013 | Soffer | G06F 3/023 345/163 |

FOREIGN PATENT DOCUMENTS

| | | |
|---|---|---|
| CN | 101968777 A | 2/2011 |
| CN | 102223732 A | 10/2011 |
| KR | 102006001379 A | 2/2006 |
| KR | 102007004009 A | 4/2007 |
| KR | 102009004048 A | 4/2009 |

OTHER PUBLICATIONS

International Search Report and Written Opinion for PCT/US2013/035087 (in English), dated Jul. 11, 2013; ISA/KR.

First Office Action and SIPO Search Report issued Jul. 1, 2016 in corresponding Chinese Application No. 201380023577.8 (in English).

* cited by examiner

ACCESS APPLIANCE PROVIDING DIRECT DISPLAY DATA CHANNEL (DDC) INTERFACE CONNECTION AND STORED MONITOR CALIBRATION INFORMATION

CROSS-REFERENCE TO RELATED APPLICATIONS

This application claims priority to U.S. Provisional Application No. 61/620,142, filed Apr. 4, 2012. The entire disclosure of the above application is incorporated herein by reference.

TECHNICAL FIELD

The present application is directed to remote access appliances and methods, and more particularly to a remote access appliance that is able to bi-directionally communicate with a Data Display Channel (DDC) interface of a monitor, and which also provides non-volatile storage for Extended Display Identification (EDID) information pertaining to the specific monitor that is being used with the appliance.

BACKGROUND

This section provides background information related to the present disclosure which is not necessarily prior art.

Present day data centers often make use of one or more remote access switches, sometimes termed "KVM" switches, for providing keyboard, video and mouse connectivity from a remote monitor to a selected one of a plurality of computers (typically workstations or servers) in a work environment such as an office or a data center. The Avocent Corp. of Huntsville, Ala. is a leader in providing state of the art data center connectivity and management products, and provides a number of different remote access switches that are suitable for various data center applications.

Presently available remote access appliances typically may provide a selected computer in a work environment or a data center with indirect access to "Extended Display Identification" (EDID) information relating to a monitor of a remote terminal, which is attempting to access the selected computer. The EDID information may be provided by the appliance to the selected computer. But in this configuration, the computer does not have direct access to the Data Display Channel (DDC) interface of the monitor. A real-time, bi-directional communications link with the DDC interface of the monitor is highly beneficial because it allows the selected computer to perform various calibration operations on the monitor (or on the data transmitted to the monitor) using real-time calibration information collected by one or more sensors of the monitor, and made available on the monitor's DDC interface. If this sensor data was made available to the selected computer via the DDC interface, the selected computer could use the data to calibrate the video data prior to sending the video data to the monitor.

In other instances a selected computer may have access to the DDC interface of the monitor (via the appliance), but can only obtain the EDID information from the monitor during its (the computer's) boot up process. In other words, there is no provision for supplying the EDID information to the selected computer from an external source or external location. As a result, this requires the selected computer to be rebooted (if it is already up and running) in order for it to obtain the EDID of a monitor that has selected it for use.

SUMMARY

In one aspect the present disclosure relates to a remote access appliance configured to provide electronic display identification data (EDID) information associated with a monitor which is communicating with the appliance, to any one of a plurality of remote computers configured to communicate with the appliance, without requiring rebooting of a selected one of the remote computers. The appliance may comprise a controller and a plurality of multiplexers. The multiplexers may be controllable by the controller for interfacing a selected one of the computers to a display data channel (DDC) interface associated with the monitor. The appliance may also include a plurality of memory devices accessible by each of the computers and by the controller, for storing the EDID information associated with the monitor. The controller may be configured to control the multiplexers so that either any selected one of the computers is able to be placed in communication with the monitor, and able to access an associated one of the memory devices to obtain the stored EDID information, or that the EDID information from the DDC interface is able to be loaded into each of the memory devices.

In another aspect the present disclosure relates to a remote access appliance configured to provide electronic display identification data (EDID) information associated with a monitor which is communicating with the appliance, to any one of a plurality of remote computers configured to communicate with the appliance, without requiring rebooting of a selected one of the remote computers. The appliance may comprise a monitor multiplexer (MUX) in communication with a display data channel (DDC) interface associated with the monitor. The appliance may also comprise a DDC multiplexer (MUX) in communication with the DDC interface of the monitor MUX and with a plurality of remote computers. A plurality of memory devices may be included which are in communication with the plurality of remote computers for storing the EDID information associated with the monitor. A controller may be included which is configured to control the DDC MUX to select one of the plurality of remote computers for use with the monitor, and to load the EDID information from the DDC interface of the monitor into each of the memory devices.

In still another aspect the present disclosure relates to a method for providing electronic display identification data (EDID) information associated with a monitor, via a remote access appliance, to any one of a plurality of remote computers, and without requiring rebooting of any of the remote computers. The method may comprise providing a controller and using a plurality of multiplexers controlled by the controller to interface a selected one of the computers to a display data channel (DDC) interface associated with the monitor. The method may further comprise using a plurality of memory devices accessible by each of the computers and by the controller, for storing the EDID information associated with the monitor. The controller may be used to control the multiplexers so that any selected one of the computers is able to be placed in communication with the monitor and able to access an associated one of the memory devices to obtain the stored EDID information.

BRIEF DESCRIPTION OF DRAWINGS

The drawings described herein are for illustrative purposes only of selected embodiments and not all possible implementations, and are not intended to limit the scope of the present disclosure. In the drawings.

Corresponding reference numerals indicate corresponding parts throughout the several views of the drawings.

DETAILED DESCRIPTION

Figure 1:
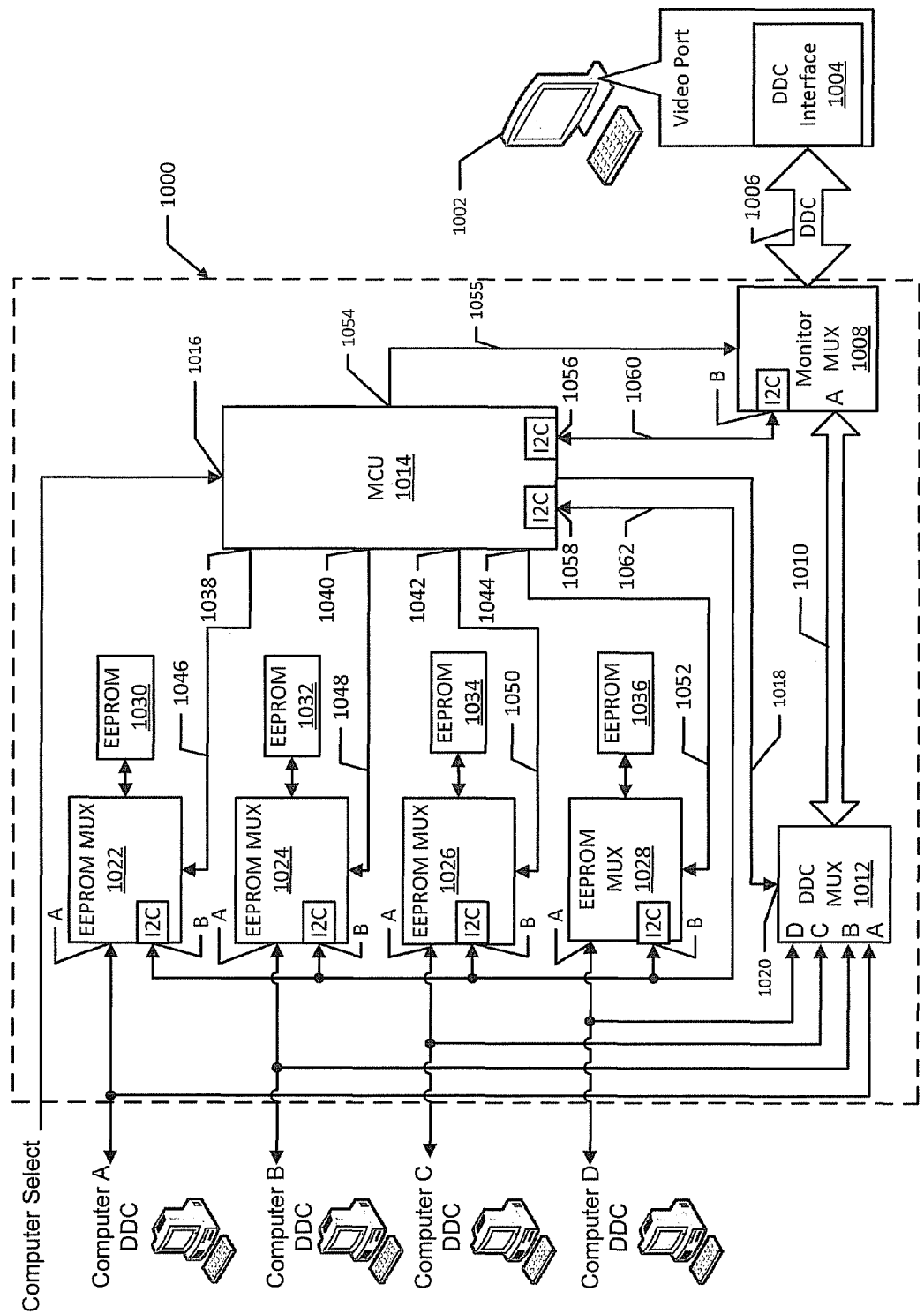
FIG. 1 is a high level diagram of a remote access appliance in accordance with another embodiment of the present disclosure that enables a direct, bidirectional communication link between a selected one of a plurality of computers and a DDC interface of a remote monitor, as well as enables the selected computer to be provided with stored EDID information pertaining to the monitor's capabilities.

The following description is merely exemplary in nature and is not intended to limit the present disclosure, application, or uses. It should be understood that throughout the drawings, corresponding reference numerals indicate like or corresponding parts.

Referring to FIG. 1, a remote access appliance 1000 is shown that is able to provide a direct, bi-directional communications link between any selected one of a plurality of available computers and a DDC (Display Data Channel) interface 1004 of a monitor 1002. The DDC interface 1004 forms a portion of the video port of the monitor 1002. In the drawing of FIG. 1 only four computers "Computer A", "Computer B", "Computer C" and "Computer D" are shown, but it will be appreciated that in a typical application a greater or lesser plurality of such computers may be implemented. The Computers A-D may be computer workstations or even servers that are accessible by the monitor 1002, typically through a local area network (LAN), or possibly over a wide area network (WAN) connection. The Computers A-D, monitor 1002 and its DDC interface 1004 do not actually form part of the appliance 1000. Rather, the appliance 1000 enables bi-directional communications between any of the Computers A-D and the DDC interface 1004 of the monitor 1002. The Computers A-D may be located in a common location such as in a traditional data center environment room, or possibly located throughout a work environment or even in different locations.

The appliance 1000 may make use of a DDC bus 1006 that couples a monitor multiplexer ("MUX") 1008 to the DDC interface 1004. Throughout the following discussion the term "MUX" shall mean "multiplexer". The monitor MUX 1008 may be coupled via a suitable bi-directional bus 1010 to a DDC MUX 1012. In this example the four ports A-D of the DDC MUX 1012 are coupled to the Computers A-D.

The appliance 1000 further may include a microcontroller unit ("MCU") 1014 having an input 1016 for receiving a "Computer Select" signal from an external source, such as a user activated pushbutton or switch. The MCU 1014 may take a plurality of forms, but one component suitable for this purpose is an MSP430 available from Texas Instruments Corp. The "Computer Select" instruction instructs the MCU 1014 as to which one of the available Computers A-D is to be used. The MCU 1014 uses this information to control the DDC mux 1012 with a control signal on DDC MUX control line 1018 that is applied to a control input 1020 on the DDC MUX 1012.

The MCU 1014 is also in communication with a plurality of EEPROM MUXs 1022, 1024, 1026 and 1028. Each of the EEPROM MUXs 1022-1028 is uniquely associated with one of a plurality of EEPROMs (electrically erasable, programmable, read only memory) 1030, 1032, 1034 and 1036, and is able to write information to, and read information from, its associated EEPROM. EEPROM MUX 1022 and EEPROM 1030 are uniquely associated with Computer A; EEPROM MUX 1024 and EEPROM 1032 are uniquely associated with Computer B; EEPROM MUX 1026 and EEPROM 1034 are uniquely associated with Computer C; and EEPROM MUX 1028 and EEPROM 1036 are uniquely associated with Computer D.

The MCU 1014 further includes a plurality of control outputs 1038, 1040, 1042 and 1044 that may be used to apply control input signals to each of the EEPROM MUXs 1022-1028 on control lines 1046, 1048, 1050 and 1052, respectively. The signals on control lines 1046-1052 serve to select which one of the two inputs A or B on each EEPROM MUX 1022-1028 is in communication with the EEPROM MUX's respective EEPROM 1030-1036. The MCU 1014 also includes a control output 1054 that controls the selection of either port A or port B of the monitor MUX 1008, via signal line 1055.

The MCU 1014 may also include an internal I2C interface that communicates with ports 1056 and 1058 of the MCU 1014. Signal line 1060 forms a bi-directional I2C signal line for communicating with the "B" port (i.e., the I2C port) on the monitor MUX 1008, while I2C signal line 1062 forms a bi-directional signal line for communicating with the "B" ports (the I2C ports) on each of the EEPROM MUXs 1022-1028.

Figure 2:
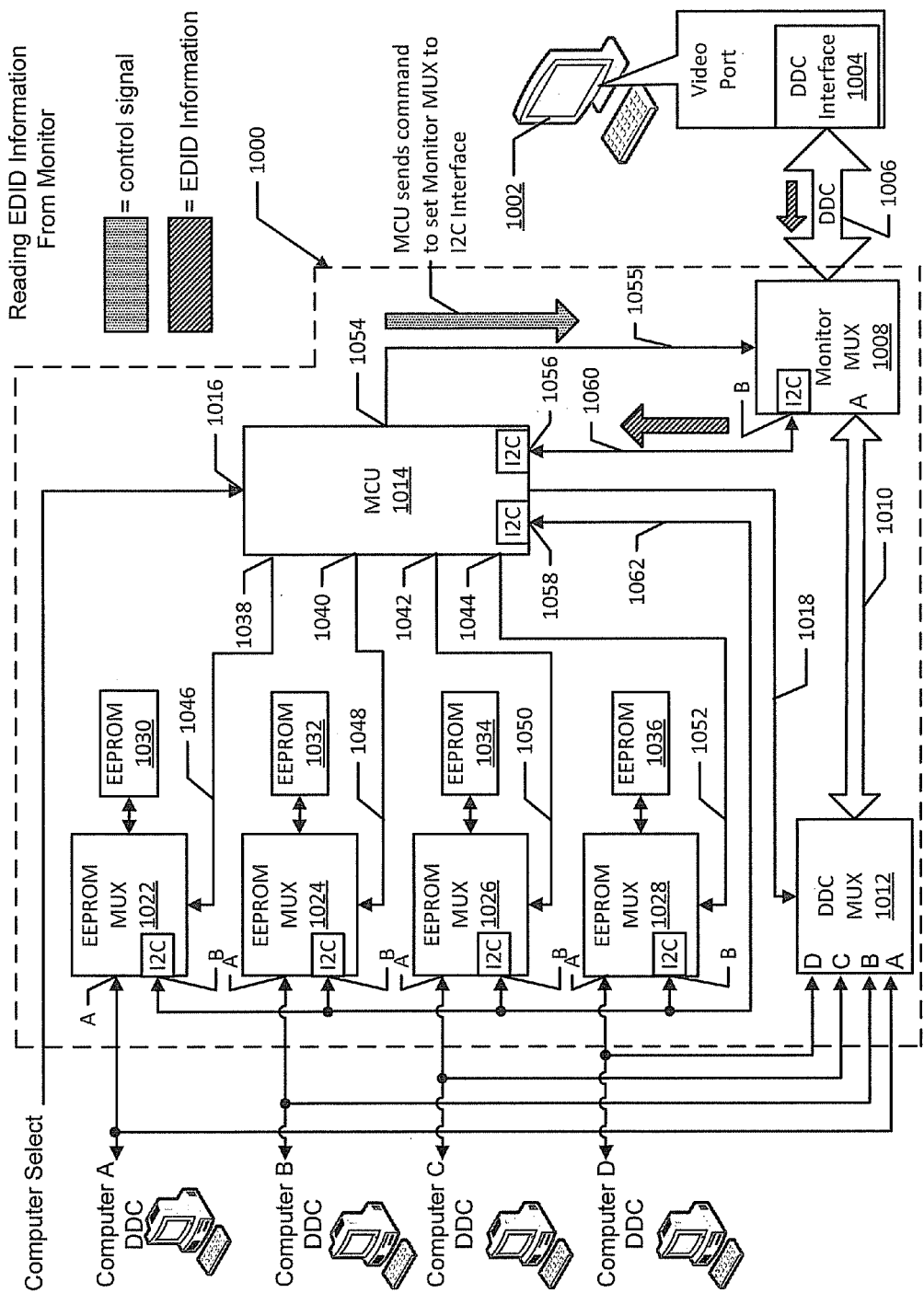
FIG. 2 illustrates the remote access appliance of FIG. 1 with arrows indicating control signal and data flows when an MCU configures a DDC multiplexer to provide the monitor's EDID information to the MCU.
Figure 3:
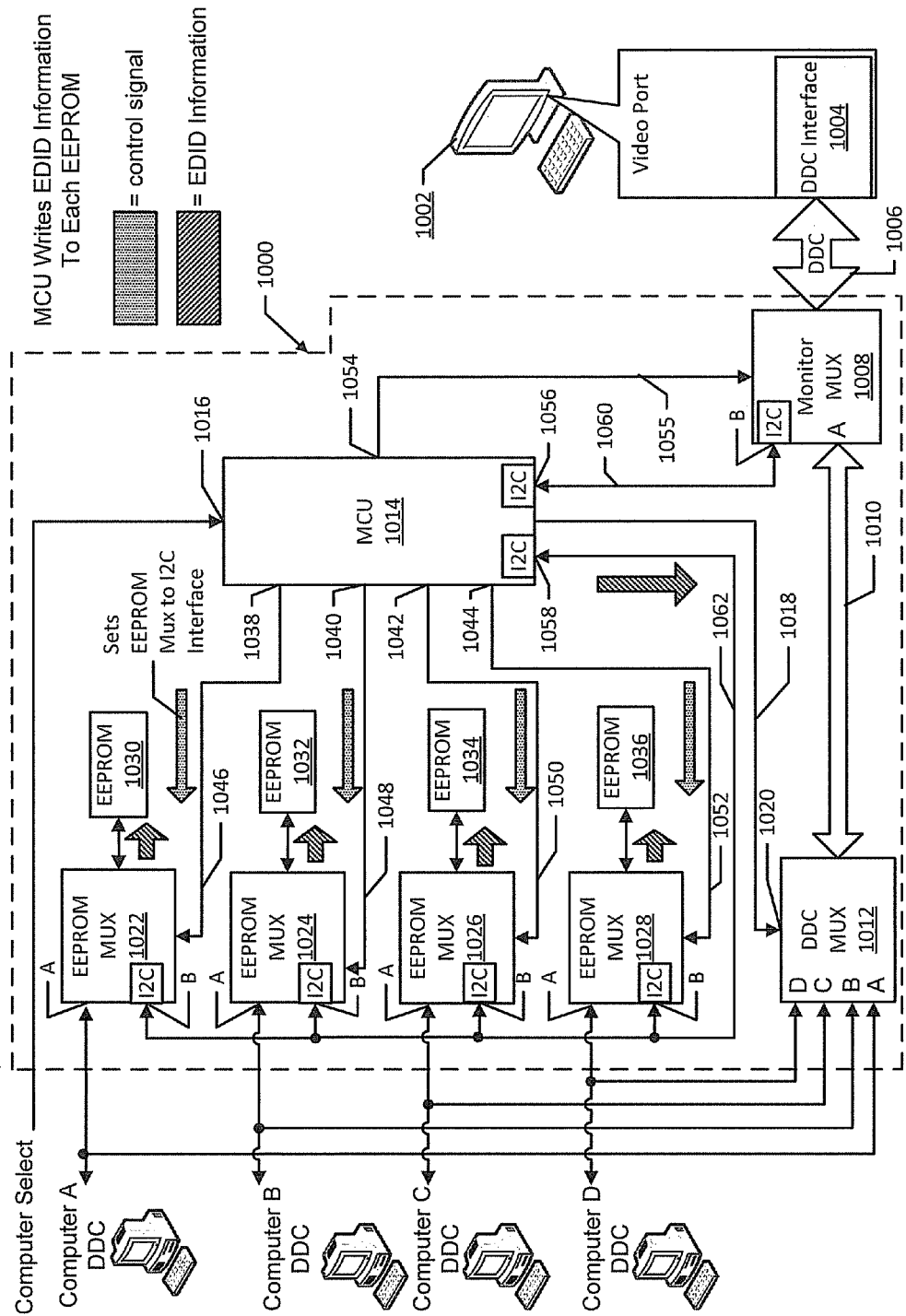
FIG. 3 illustrates the remote access appliance of FIG. 2 showing how the MCU configures each EEPROM MUX so that it can each be used to write the EDID information into its associated EEPROM.
Figure 4:
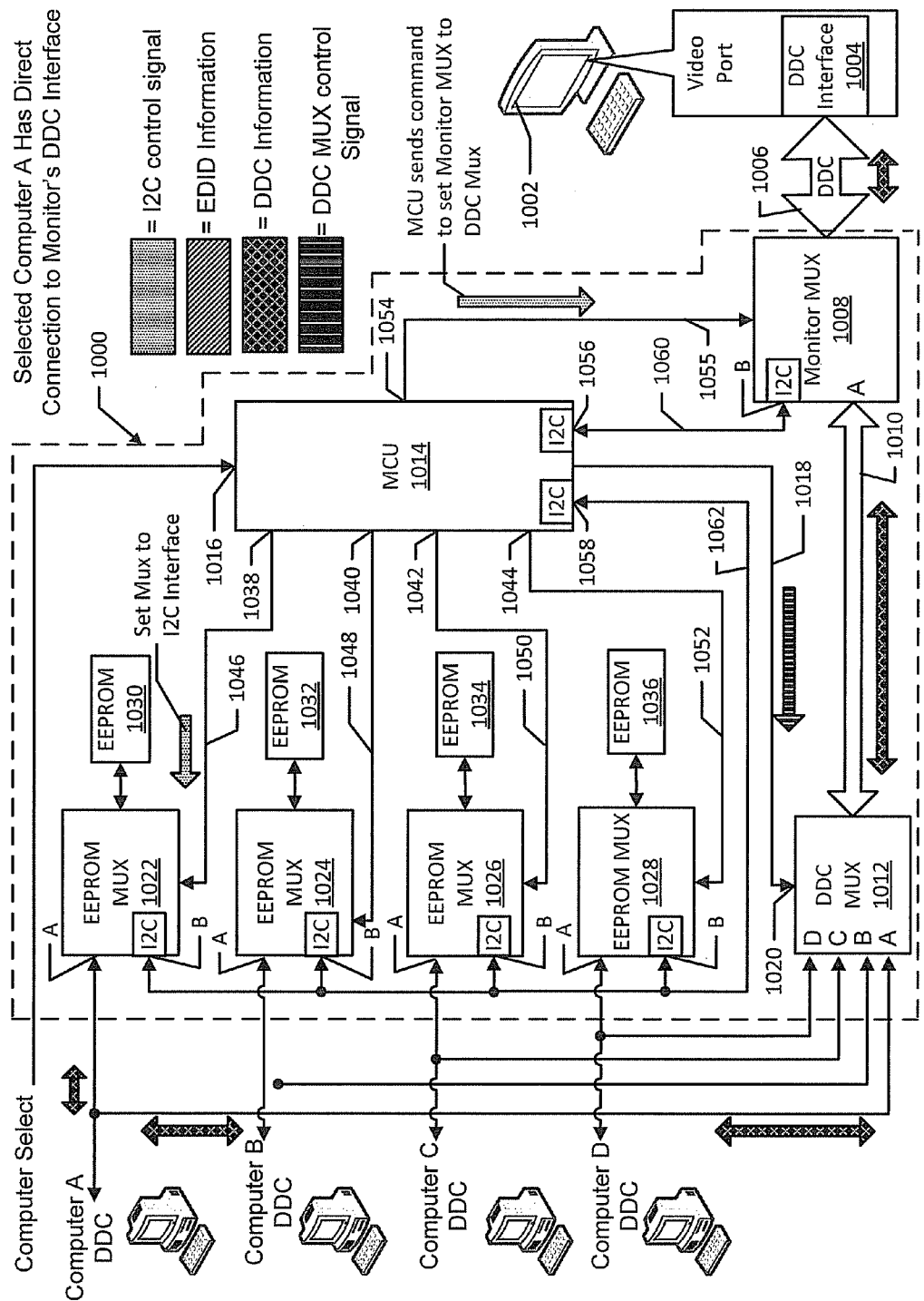
FIG. 4 shows the normal operation of the remote access appliance of FIG. 1 illustrating how the MCU configures the DDC MUX to select one of the available computers, and further showing how the DDC information flows through the system, and further showing how the MCU sets the EEPROM MUX associated with the selected computer to the I2C interface to prevent any communication with the EEPROM.
Figure 5:
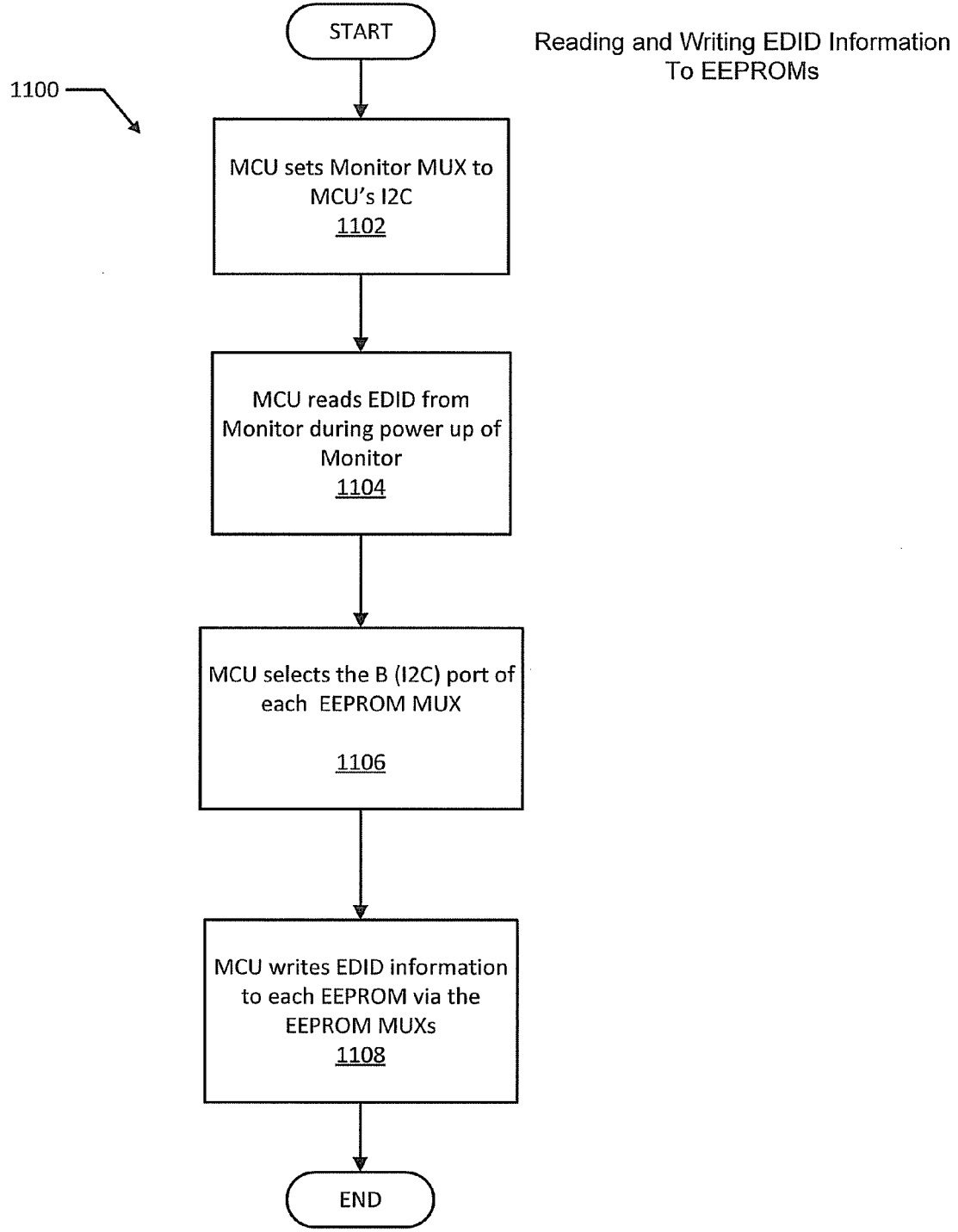
FIG. 5 is a flowchart illustrating operations performed by the MCU of the appliance of FIG. 1 when it initially obtains and writes the EDID information to the EEPROMs associated with each of the computers.

Referring to FIGS. 2, 3 and 4, the operation of loading EDID information from the monitor 1002 into the EEPROMs 1030-1036 will be described. In FIGS. 2 and 3, differently shaded arrows have been used to identify the flows of control signals and the flow of EDID information obtained from the DDC Interface 1004 of the monitor 1002. Accordingly, FIGS. 2 and 3 "track" the operations that will be discussed in FIG. 5. Referring specifically to FIG. 5, a flowchart 1100 sets forth a sequence of operations that illustrate one example of how the EDID information may be read from the DDC interface 1004 and then written into each of EEPROMs 1030-1036 during an initial configuration operation. Initially at operation 1102, the MCU 1014 sets the monitor MUX 1008 via a control signal on control line 1055 so that the monitor MUX's B (I2C) port is selected for use. This places port B of the monitor MUX 1008 in communication with the DDC interface 1004 via the DDC bus 1006. At operation 1104 the MCU 1014 then reads the EDID from the monitor 1002 via the DDC interface 1004 when the monitor 1002 is first powered up (see also FIG. 2). At operation 1106 the MCU 1014 generates control signals on lines 1046-1052 which select the B (I2C) port of each EEPROM MUX 1022-1028 (see also FIG. 3). At operation 1108 the MCU 1014 writes the EDID information to each EEPROM 1030-1036 through its associated EEPROM MUX 1022-1028 (see also FIG. 3). At this point each of the EEPROMs 1030-1036 will have the EDID information stored in their non-volatile memory and available to provide to the Computers A-D whenever any one or more of the Computers A-D is booted up. Put differently, a given one of the Computers A-D does not have to be selected for use to obtain the EDID information from its associated EEPROM 1030-1036. In other words, if the user of the monitor 1002 should at some future time select Computer C, when Computer C is already booted up and running, then there will be no need to reboot Computer C for it to obtain the monitor's 1002 EDID information; it will already have obtained the EDID information from its associated EEPROM 1034 during its previous boot cycle. This is a significant benefit because without the ability to obtain the EDID information from one of the EEPROMs 1030-1036, one would need to reboot Computer C after it has been selected for use.

Figure 6:
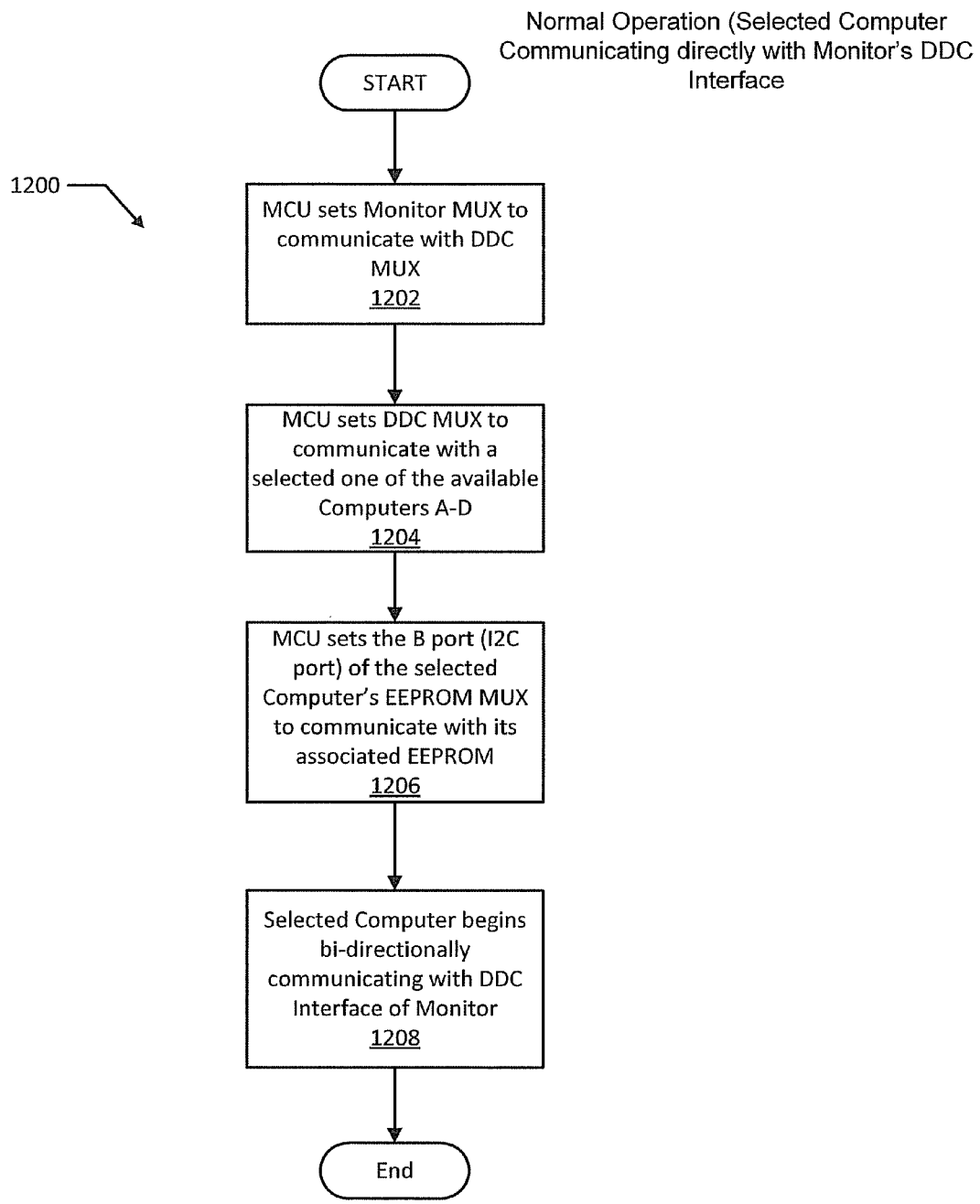
FIG. 6 is a flowchart illustrating operations performed by the MCU in controlling the DDC MUX, the Monitor MUX and the EEPROM MUX associated with Computer A during normal operation.

Referring now to FIGS. 4, 5, and 6, normal operation of the appliance 1000 will be described. Referring specifically to FIG. 6, flowchart 1200 shows one example of how Computer A may be selected for use by the appliance 1000. At operation 1202 the MCU 1014 sends a control signal on signal line 1055 to select port A of the monitor MUX 1008 for use. This provides a direct signal path from the DDC interface 1004 to the DDC MUX 1012 via the bus 1010 and the DDC bus 1006. At operation 1204 the MCU 1014 sets the DDC MUX 1012 to communicate with a selected one of the available Computers A-D via a signal applied to the input port 1020 of the DDC MUX on control line 1018. The signal selects one of ports A, B, C or D of the DDC MUX 1012, which places the selected computer in bi-directional communication with the DDC interface 1004. For this example assume that Computer A has been selected for use, which means that port "A" on the DDC MUX 1012 will have been selected. In this manner a real time, bi-directional communications link is created between Computer A and the monitor's DDC interface 1004. At operation 1206 the MCU 1014 then sends a control signal on control line 1046 that sets the EEPROM MUX 1022 associated with Computer A (since Computer A has been selected) so that it's port B (its I2C port) is in communication with the EEPROM 1030. This prevents Computer A from getting responses from the EEPROM 1030 through the EEPROM MUX 1022 and enables only responses from the DDC interface 1004 to be communicated to Computer A. Computer A can then use the DDC information to select an appropriate video timing mode so that the video data presented to the monitor 1002 is optimized for the capabilities of the monitor 1002. Importantly, the established bi-directional path enables color related attributes to be calibrated.

In summary then, the appliance 1000 enables at least two distinct and important operations to be accomplished within a remote access appliance, those being enabling each one of the Computers A-D to be provided with the important EDID information associated with the monitor 1002 when the computer is not selected. Thus, there is no need for any one of the Computers A-D to be selected for use by the monitor 1002 before the EDID information is made available to all of the Computers A-D. Each of the Computers A-D will thus have this information available for use in the event it is selected by the user through use of the monitor 1002. Secondly, whichever Computer A-D is selected for use, that specific Computer will be immediately provided with a bi-directional communications link to the monitor's DDC interface 1004. The video graphics card of the selected Computer can then calibrate the video data, in real time, as needed to optimize the display of the video data on the monitor 1002 in accordance with the monitor's capabilities. These two important features are combined into one remote access appliance (e.g., a KVM appliance); thus, no separate cabling between the monitor 1002 and the appliance 1000 is required, and no additional output port is required on the monitor 1002 for implementing these functions.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A remote access appliance comprising:
the appliance being configured to provide electronic display identification data (EDID) information related to a monitor which is communicating with the appliance, to any one of a plurality of computers configured to communicate with the appliance, without requiring rebooting of a selected one of the computers, the appliance comprising:
a controller;
a plurality of multiplexers, including a monitor multiplexer, controllable by the controller for interfacing a selected one of the computers to a display data channel (DDC) interface related to the monitor;
a plurality of memory devices accessible by each of the computers and by the controller, for storing the EDID information related to the monitor, the controller configured to control the plurality of multiplexers so that new EDID information available from the monitor is simultaneously written into each of the memory devices when made available to the controller;
the controller further configured to control the multiplexers so that either:
any selected one of the computers is placed in communication with the monitor and accesses an associated one of the memory devices to obtain the stored EDID information; or
EDID information from the DDC interface is loaded into each of the memory devices;
a DDC multiplexer configured to communicate with the monitor multiplexer and with the computers, and being controlled by the controller so that a direct communications link between the selected one of the computers and the monitor multiplexer can be established; and
the controller further being configured to inhibit communication between a selected one of the computers and a specific one of the memory devices associated with the selected one of the computers, while enabling the direct communication communications link to be created between the DDC interface, the DDC multiplexer, the monitor multiplexer, and the selected one of the computers.

2. The appliance of claim 1, wherein the monitor multiplexer is in communication with the DDC interface and with the controller, the monitor multiplexer being controllable by the controller to permit communication with:
any one of the computers; or
with an input of the controller by which the EDID information from the DDC interface is obtained by the controller.

3. The appliance of claim 1, wherein the memory devices comprise a plurality of electrically erasable, programmable read only memory (EEPROM) devices that each are configured to store the EDID information.

4. The appliance of claim 3, wherein the plurality of multiplexers comprises a plurality of electrically erasable, programmable read only multiplexers controlled by the controller to enable access the EEPROM devices by either the controller or an associated one of the computers.

5. The appliance of claim 1, wherein the controller further comprises an input for enabling a user to select a specific one of the computers for use.

6. A remote access appliance comprising:
the appliance being configured to provide electronic display identification data (EDID) information related to a monitor which is communicating with the appliance, to any one of a plurality of computers configured to communicate with the appliance, without requiring rebooting of a selected one of the computers, the appliance comprising:
a monitor multiplexer (MUX) in communication with a display data channel (DDC) interface related to the monitor;
a DDC multiplexer (MUX) in communication with the DDC interface of the monitor MUX and with the plurality of computers;
a plurality of memory devices in communication with the plurality of computers for storing the EDID information related to the monitor;
a controller configured to:
control the DDC MUX to select one of the plurality of computers for use with the monitor and to establish a direct communications path with a DDC interface of the monitor; and
load the EDID information from the DDC interface of the monitor into each of the memory devices simultaneously when available to the controller; and
the controller further being configured to inhibit communication between a selected computer of the plurality of computers and a specific one of the memory devices related to the selected computer, while enabling a direct communication link to be created between the DDC interface, the DDC MUX, the monitor multiplexer, and the selected computer.

7. The appliance of claim 6, further comprising a plurality of storage device multiplexers in communication with the memory devices and with the computers, which are controlled by the controller to enable:
access to the memory devices by the controller for the purpose of loading the EDID information into each of the memory devices; and
access to the memory devices by the computers for the purpose of reading the EDID information stored in the memory devices.

8. The appliance of claim 7, wherein the controller is configured to load the EDID information simultaneously into each of the memory devices when access to the memory devices is selected by the controller.

9. The appliance of claim 6, further comprising an input on the controller for receiving a computer selection signal from a user by which one of the plurality of computers is selected for use with the monitor.

10. The appliance of claim 6, wherein each of the memory devices comprises an electrically erasable, programmable, read only memory.

11. The appliance of claim 7, wherein each of the storage device multiplexers is configured to be controlled by the controller.

12. The appliance of claim 6, wherein the controller is configured to control the monitor MUX so that the DDC interface is placed in communication with either the DDC MUX or an input of the controller.

13. A method comprising:
providing electronic display identification data (EDID) information related to a monitor, via a remote access appliance, to any one of a plurality of computers, and without requiring rebooting of any of the computers, the method comprising:
providing a controller;
using a plurality of multiplexers controlled by the controller to interface a selected one of the computers to a display data channel (DDC) interface related to the monitor, the plurality of multiplexers including a monitor multiplexer;
using a plurality of memory devices accessible by each of the computers and by the controller, for storing the EDID information related to the monitor;
causing the controller to control the multiplexers so that any selected one of the computers is able to be placed in communication with the monitor and accesses an associated one of the memory devices to obtain the stored EDID information;
using a DDC multiplexer (MUX) configured to communicate with the monitor multiplexer and with the computers, and being controlled by the controller so that a direct communication link between the selected one of the computers and the monitor multiplexer is established;
using the controller to inhibit communication between a selected one of the computers and a specific one of the memory devices related to the selected one of the computers, while enabling a direct communication link to be created between the DDC interface, the DDC multiplexer, the monitor multiplexer, and the selected one of the computers; and
wherein the controller to control the multiplexers so that the EDID information from the DDC interface is loaded into each of the memory devices.

14. The method of claim 13, wherein the monitor multiplexer is in communication with the DDC interface and with the controller, and using the controller to control the monitor multiplexer to permit communication with:
any one of the computers; or
with an input of the controller by which the EDID information from the DDC interface is obtained by the controller.

15. The method of claim 13, wherein using a plurality of memory devices comprises using a plurality of electrically erasable, programmable read only memory (EEPROM) devices that each are configured to store the EDID information.

16. The method of claim 13, further comprising using an input of the controller to receive a signal that informs the controller of a selection of a specific one of the computers for use with the monitor.

* * * * *